June 26, 1962 W. E. O'DELL 3,040,706

FEEDER FOR PARAKEET AVIARIES

Filed June 8, 1959

INVENTOR.
William E. O'dell
BY
Hovey, Schmidt, Johnson & Hovey
ATTORNEYS.

United States Patent Office 3,040,706
Patented June 26, 1962

3,040,706
FEEDER FOR PARAKEET AVIARIES
William E. O'Dell, 1324 Cleveland, Kansas City, Mo.
Filed June 8, 1959, Ser. No. 818,744
1 Claim. (Cl. 119—51)

This invention relates to a feeder for parakeet aviaries and has for its primary object the provision of an arrangement of parts making it impossible for the birds to contaminate their food, and also eliminating spillage of the food to the floor of the cage or outside the cage as in the case of conventional feeders of which I am aware.

It is the most important object of the present invention to provide a feeder that has a food tray therewithin so disposed and arranged that food which is spilled by the birds is collected in an auxiliary compartment adjacent the tray and at the zone where spilling normally occurs.

Another important object of the present invention is to provide a feeder that makes it impossible for the birds to roost thereon except on a perch provided with the feeder, thereby eliminating droppings in the food.

Figure 1:
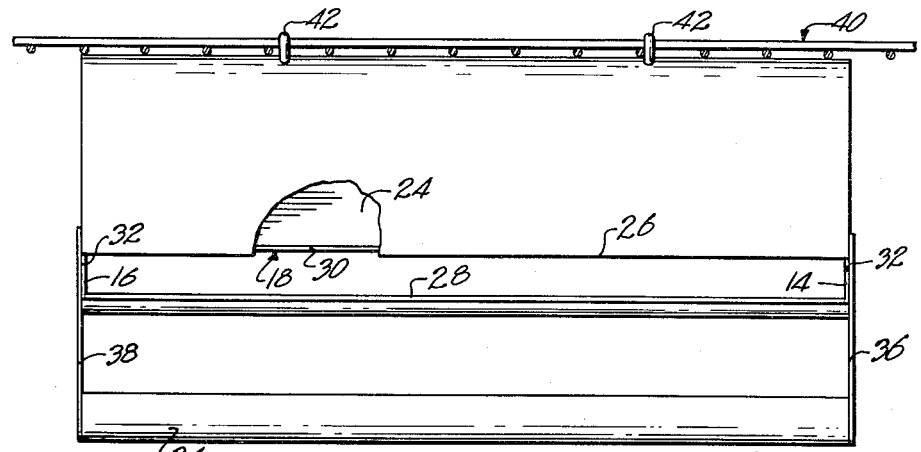
FIG. 1 is a top plan view of a feeder for parakeet aviaries made pursuant to my present invention, parts being broken away for clearness, illustrating fragmentarily the cage upon which it is supported.
Figure 2:
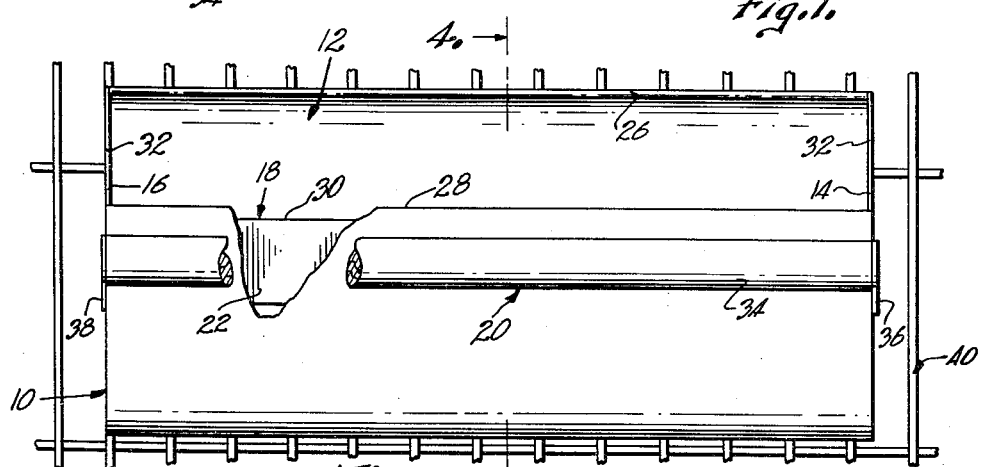
FIG. 2 is a front elevational view thereof, parts being broken away for clearness.
Figures 3, 4:
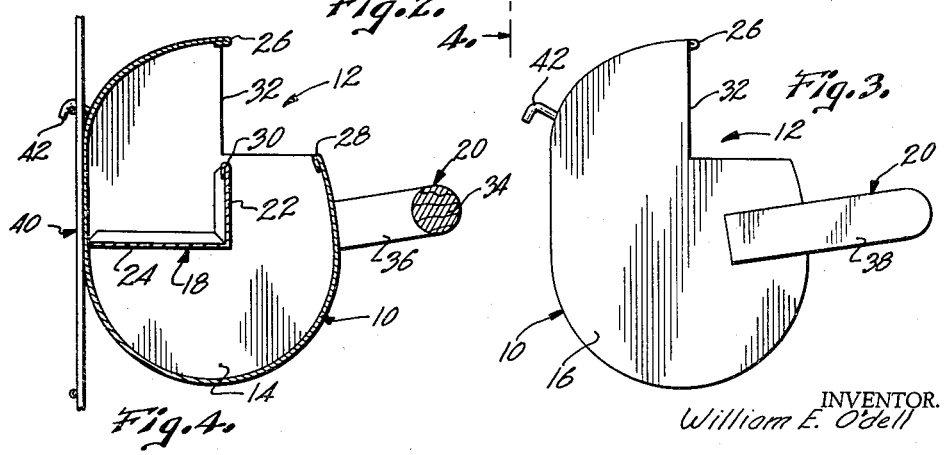
FIG. 3 is an end elevational view thereof.
FIG. 4 is a cross-sectional view taken on line 4—4 of FIG. 2.

An elongated tube 10 disposed with its longitudinal axis horizontally, has an opening 12 adjacent the top thereof, and a pair of plates 14 and 16 closing its ends. A food tray 18 is disposed in the tube 10 so as to be accessible to a bird through the opening 12 when the bird stands on a perch 20. It is to be noted that the tray 18 is disposed below and rearwardly of the opening 12 and that both the tray 18 and the opening 12 span the distance between the plates 14 and 16.

Tray 18 has an upright front wall 22 and a horizontal bottom wall 24 extending from the front wall 22 to the back of the tube 10. Bottom wall 24 merges with the front wall 22 substantially on the aforementioned horizontal axis of the tube 10. Tube 10 has a pair of spaced, longitudinal edges 26 and 28 coextensive in length therewith and in substantial parallel alignment with the upper longitudinal edge 30 of the front wall 22, it being understood that the edges 26 and 28 define the longitudinal opening or slot in the tube 10 and, if desired, the plates 14 and 16 may be provided with notches 32 adjacent the opening 12.

Perch 20 includes a rod 34 disposed forwardly and in spaced relationship to the front of the tube 10 slightly below the plane of edge 28 and held in such position by a pair of arms 36 and 38 secured to the outer faces of the plates 14 and 16 respectively.

The entire feeder may be supported within the cage and particularly, on foraminous wall 40 thereof by a plurality of hooks 42 on the back of the tube 10.

By virtue of the arcuate configuration of the outer face of the tube 10, and the disposition of the axis opening 12 therein, the birds find it difficult, if not impossible, to roost on the tube 10 itself, particularly if the outer surface of the tube 10 is metallic or made from other smooth, slick material. Even when the birds are on the perch 20, droppings are not likely to fall into the tube 10, but more particularly, it is not possible for the birds to contaminate the food within the tray 18.

During feeding, the birds on the perch 20 can easily reach the food in the tray 18 and as the food is removed, spillage is collected in the tube 10 between edges 28 and 30.

The feeder can easily be removed from the wall 40 of the cage for cleaning and refilling of the tray 18 with food.

Having thus described the invention what is claimed as new and desired to be secured by Letters Patent is:

A bird feeder comprising an elongated tube having means thereon closing the ends thereof and having a longitudinally extending portion removed therefrom to form an access opening therein, said opening being defined by a pair of spaced, longitudinally extending edges in the tube, said tube mounted in a position with the longitudinal axis thereof normally horizontally disposed to present therefor a top, a bottom and a pair of opposed sides interconnecting said top and bottom and with one of said opening defining edges being disposed therein at the junction between one of said sides and said top; an elongated food tray in said tube and extending substantially the length thereof, said tray including a normally horizontally disposed bottom wall one edge of which is secured to the opposite side of said tube above said bottom and below said opening and extending toward said axis, and a longitudinally extending normally vertically disposed side wall beneath said one edge and secured to said bottom wall adjacent said axis and extending upwardly from said bottom wall in inwardly spaced relationship to said one side; and an elongated rod secured to said one side substantially parallel to said axis and spaced outwardly from said opening, said rod providing a perch for the tube, said side wall of said tray terminating in laterally spaced relationship to said opening, whereby food displaced out of said tray by a bird feeding through said opening, is collected at said bottom below said opening and between said one side and said side wall.

References Cited in the file of this patent
UNITED STATES PATENTS

| | | |
|---|---|---|
| 1,750,580 | Ebel | Mar. 11, 1930 |
| 2,011,684 | Martin | Aug. 20, 1935 |
| 2,656,819 | Meier | Oct. 27, 1953 |
| 2,707,454 | Wilkerson | May 3, 1955 |
| 2,737,152 | DuRall | Mar. 6, 1956 |